(12) United States Patent
    Duch

(10) Patent No.: US 11,897,283 B2
(45) Date of Patent: Feb. 13, 2024

(54) OPTIMIZED SEALING DEVICE FOR A BEARING UNIT

(71) Applicant: Aktiebolaget SKF, Gothenburg (SE)

(72) Inventor: Daniele Duch, San Gillio (IT)

(73) Assignee: AKTIEBOLAGET SKF

(*) Notice: Subject to any disclaimer, the term of this patent is extended or adjusted under 35 U.S.C. 154(b) by 155 days.

(21) Appl. No.: 17/464,222

(22) Filed: Sep. 1, 2021

(65) Prior Publication Data
    US 2022/0072901 A1    Mar. 10, 2022

(30) Foreign Application Priority Data
    Sep. 8, 2020   (IT) .................. 102020000021160

(51) Int. Cl.
    *F16C 33/80*      (2006.01)
    *F16J 15/3204*    (2016.01)
    *F16J 15/3264*    (2016.01)
    *F16C 33/78*      (2006.01)
    (Continued)

(52) U.S. Cl.
    CPC ...... B60B 27/0073 (2013.01); F16C 33/7883 (2013.01); F16C 33/7886 (2013.01); F16C 33/805 (2013.01); F16J 15/3204 (2013.01); F16J 15/3264 (2013.01); F16J 15/447 (2013.01); *F16C 2326/02* (2013.01)

(58) Field of Classification Search
    CPC ............. F16C 33/7689; F16C 33/7863; F16C 33/7883; F16C 33/7886; F16C 33/805; B60B 27/0073
    See application file for complete search history.

(56) References Cited

U.S. PATENT DOCUMENTS 9,956,820  B2 *  5/2018  Gulli ................. F16C 33/782
10,119,571 B2 * 11/2018  Seno .................. F16C 33/80
11,156,251 B2 * 10/2021  Nastasi ............. F16J 15/3264
(Continued)

FOREIGN PATENT DOCUMENTS

DE      102018212108        2/2019
DE      102010064672       10/2019
(Continued)

OTHER PUBLICATIONS

Search Report for corresponding Italian Patent Application No. 102020000021160 dated May 28, 2021.

*Primary Examiner* — James Pilkington
(74) *Attorney, Agent, or Firm* — Reed Smith LLP

(57) ABSTRACT

Sealing device for a bearing unit, having a stationary part, in turn provided with a first metal screen formed by an annular shaped portion and by a cylindrical portion radially external with respect to the annular shaped portion, with an elastomer coating, co-moulded on the first screen, having an annular shaped portion and a cylindrical portion, and with a contacting lip, radially internal, forming part of the elastomer coating and axially external with respect to the annular shaped portion, and a rotating part provided with a second metal screen on which the contacting lip makes sliding contact, where the elastomer coating is provided with a lip, non-contacting and radially internal with respect to the cylindrical portion and at least one first radial labyrinth seal (Gr) is formed by a radially outer wing of the second screen and by the lip of the elastomer coating which faces the aforementioned wing.

18 Claims, 2 Drawing Sheets

(51) Int. Cl.
*B60B 27/00* (2006.01)
*F16J 15/447* (2006.01)

(56) References Cited

U.S. PATENT DOCUMENTS

| | | | |
|---|---|---|---|
| 11,359,671 B2 * | 6/2022 | Duch | B60B 27/0073 |
| 2016/0236509 A1 | 8/2016 | Gulli et al. | |
| 2018/0135700 A1 | 5/2018 | Senda | |
| 2020/0392999 A1 * | 12/2020 | Häpp | F16C 33/7886 |

FOREIGN PATENT DOCUMENTS

| | | |
|---|---|---|
| EP | 2832559 | 2/2015 |
| IT | T020120604 | 1/2014 |
| JP | 2011208683 | 10/2011 |

\* cited by examiner

OPTIMIZED SEALING DEVICE FOR A BEARING UNIT

CROSS-REFERENCE RELATED APPLICATIONS

This application is based on and claims priority to Italian Patent Application No. 102020000021160 filed on Sep. 8, 2020, under 35 U.S.C. § 119, the disclosure of which is incorporated by reference herein.

FIELD

The present invention relates to a sealing device for a bearing unit and to a bearing unit provided with the said sealing device. A sealing device and a unit are applied, preferably, but not exclusively, to a wheel hub assembly.

BACKGROUND

A sealing device may consist of a two-part cassette seal that includes a rotating portion mounted, for example, on the radially inner ring of the bearing unit, and a stationary portion mounted, for example, on the radially outer ring of the bearing unit. Still by way of example, a stationary portion may include a metal screen mounted by means of an interference fit on the radially outer ring and an elastomer portion may be co-moulded on the metal screen. Also by way of example, a second metal screen may be mounted by means of an interference fit on the rotatable radially inner ring.

DESCRIPTION OF THE DRAWINGS

The invention will now be described with reference to the accompanying drawings which illustrate a non-limiting example of embodiment thereof, in which.

DETAILED DESCRIPTION

A stationary portion of the seal, e.g., made of elastomer material, may include one or more lips which make contact with the rotating portion and ensure a sealing action with respect to the interior of the said bearing unit.

In other sealing means include a single piece and are integral with one of the rings of a bearing unit, wherein at least one contacting lip ensures a seal owing to an interference which is created during assembly of the seal in relation to a surface of the other ring of a bearing unit.

A typical design of a sealing device includes, therefore, one or more projections, called lips, which may have different forms and different orientations (typically axial and radial). Such lips make contact with rotating surfaces of a bearing unit, and in this way, a sealing device prevents the entry of contaminants from the outside. This protects internal components of bearing unit, such as rolling bodies and cages that contain rolling bodies. Another important function of a sealing device is that of preventing lubricants present inside a bearing unit from escaping.

A sliding frictional force and, consequently, energy dissipation is created between contacting lips and a corresponding rotating contact surfaces of a bearing unit. In general, sealing capacity of a seal increases with the number of contacting lips and with their rigidity. At the same time, however, with an increase of these parameters, the amount of energy dissipation also increases.

Also as a result also of ever-increasing global competition, there is a constant demand by customers, namely motor vehicle manufacturers, for continuous technical or cost-related improvements to wheel hub assemblies. In particular, with the development of technology, demand for components with a low energy dissipation has increased and continues to increase, while demand for the same performance relative to the latest solutions remains.

In order to address these industry concerns, an ideal solution would be a sealing device without any contact which could in any case manage to prevent the entry of contaminants and prevent the loss of lubricants without energy dissipation. A sealing device, without any contact does not function correctly, in particular in underwater environments.

It is, therefore, necessary to define a sealing device with low energy consumption, but with an excellent sealing performance which does not have or minimizes the aforementioned drawbacks.

Solutions in accordance with this disclosure may be applied to all generations of wheel hub assemblies. In particular, such applications include both cases where an outer ring of a bearing is rotatable, while inner rings of a bearing are stationary, and the opposite case where an inner ring rotates and an outer ring is stationary. Such solutions are also suitable for any type of rolling body (balls, rollers, tapered rollers, etc.).

Figure 1:
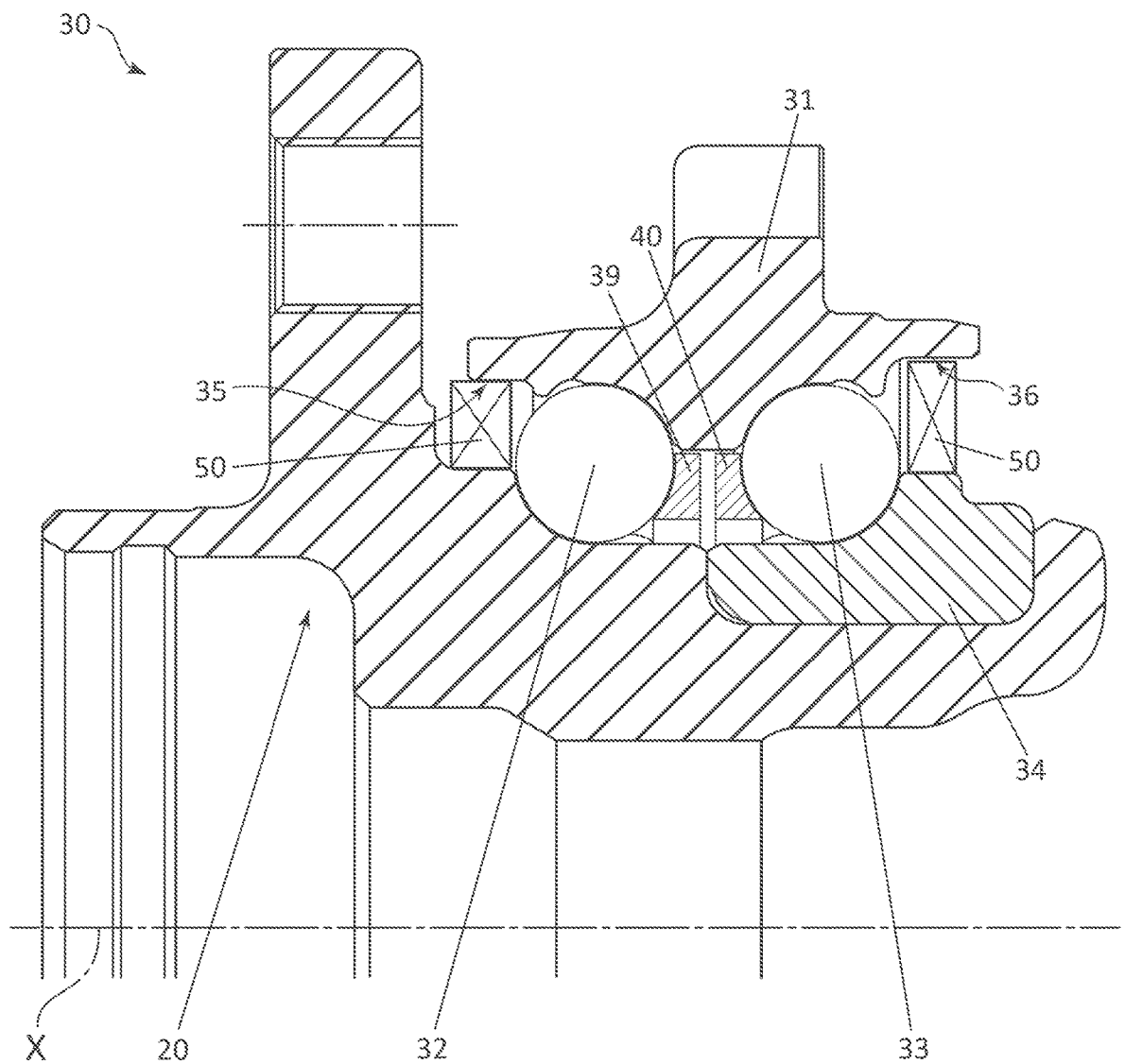
FIG. 1 is a cross-section through a wheel hub assembly provided with a bearing unit.

Purely by way of a non-limiting example, a bearing unit 30, preferably a wheel hub assembly for a motor vehicles provided with a bearing unit has a sealing device. With reference to FIG. 1, 30 denotes in its entirety a bearing unit or wheel hub assembly.

An exemplary unit has a central axis X of rotation and includes a flanged radially inner ring 20, which is rotatable, a radially outer ring 31, which is stationary, an additional, rotatable, radially inner ring 34 which is mounted on and integral with the flanged ring 20, a plurality of rolling bodies 32, 33, in this example balls, interposed between the radially outer ring 31 and the flanged ring 20, and two cages 39 and 40 for keeping in position the rolling bodies of the rows of rolling bodies 32, 33.

In the whole of the present disclosure and in the claims, the terms and the expressions indicating positions and orientations such as "radial" and "axial" are understood as referring to the central axis of rotation X of the bearing unit 30. Expressions such as "axially external" and "axially internal", instead, relate to the assembled condition of the wheel hub assembly and, in the case in question, preferably relate, to a wheel side and to a side opposite to the wheel side, respectively.

A flanged ring 20 and a radially outer ring 31 define, together and at axially opposite ends of a bearing unit 30, two cavities 35, 36 which, if not screened, could allow contaminants and impurities to enter inside the said bearing unit 30.

Therefore, in order to shield a bearing unit 30, at least one sealing device 50, realized in accordance with the principles set forth in this disclosure, may be mounted inside at least one of two cavities 35, 36.

Normally a sealing device, e.g., 50 includes two metal screens facing each other, at least one of which is provided with one or more sealing lips made of elastomeric material in sliding contact with the other screen, or only one metal screen which has one or more sealing lips which are made of elastic material and which make sliding contact with a sliding surface of the bearing unit 30 in relative movement with respect to the said seals.

Below, with reference to FIG. 2, purely way of example, a case will be illustrated where a sealing device 50 includes a rotating part provided with a metal screen 1, mounted by means of an interference fit on a flanged radially inner ring 20, and a stationary part, which includes a metal screen 10 mounted by means of an interference fit on the radially outer ring 31 and formed by an annular shaped portion 10' and a cylindrical portion 10", radially external with respect to the annular shaped portion 10', an elastomer coating 2 is co-moulded on the first screen 10 and which has a development substantially radially external and axially external with respect to the said first screen 10, the coating 2 being formed by an annular shaped portion 2' and by a cylindrical portion 2", radially external with respect to the annular shaped portion 2" and a contacting lip 9, radially internal, forming part of the elastomer coating 2 and in particular axially external with respect to the annular shaped portion 2', and therefore stationary, which makes sliding contact with the rotating second screen 1.

In addition, according to the present embodiment, the second, rotatable, metal screen 1 is preferably shaped in the manner of a "C". The radially outer wing 1' of the screen 1 is positioned in the radial direction at the height of the radially outer ring 31. In particular, the radially outer surface 1's of the wing 1', for the reasons which will be explained below, must be more or less aligned with the radially outer surface 31s of the radially outer ring 31. While in some non-limiting embodiments, a radially outer surface 1's may be configured to be aligned with a radially outer surface 31s, while in other embodiments some small tolerances is acceptable so long as it is substantially aligned.

The elastomer coating 2 is provided with a small-size lip 3, non-contacting and radially internal with respect to its cylindrical portion 2". Preferably, a lug 6, or appendage, extends also from the cylindrical portion 2" of the elastomer coating 2, in an axially external and radially external oblique direction with respect to the cylindrical portion 2". Finally, the cylindrical portion 2" of the elastomer coating 2 terminates in an axially internal direction with a static seal 4.

With the presence of these characteristic features it is possible to obtain a sealing device 50 which has a low energy dissipation, since there is only one contacting lip 9, and at the same time a high sealing efficiency due to the labyrinth seals and the contaminant storage chambers which are formed, as will now be explained.

In various embodiments, a sealing device 50 is provided with at least one first radial labyrinth seal Gr formed by a radially outer wing 1' of a metal screen 1 with a cylindrical portion 2" of an elastomer coating 2 and, in particular, with a lip 3 of elastomer coating 2 which faces wing 1'. Preferably, a size of an opening, or meatus, of a first radial labyrinth seal GR may be between 0.1 mm and 0.8 mm in an assembled condition of the bearing unit. In this way a first effective barrier is created in order to reduce flow of contaminants which reaches a pre-chamber 7, namely a volume which is created between metal screen 1, annular shaped portion 2' of an elastomer coating 2 and a contacting lip 9. It should be noted that under high load conditions, lip 3 may make contact with wing 1' of the metal screen, notwithstanding the fact that its operation under normal operating conditions will be that of a non-contacting lip. It is also important, precisely for correct operation of a lip 3, that a lug 6 of the elastomer coating should always be non-contacting, so as not to cause deformation of such an elastomer coating which negatively affects the labyrinth sealing function of a lip 3.

Figure 2:
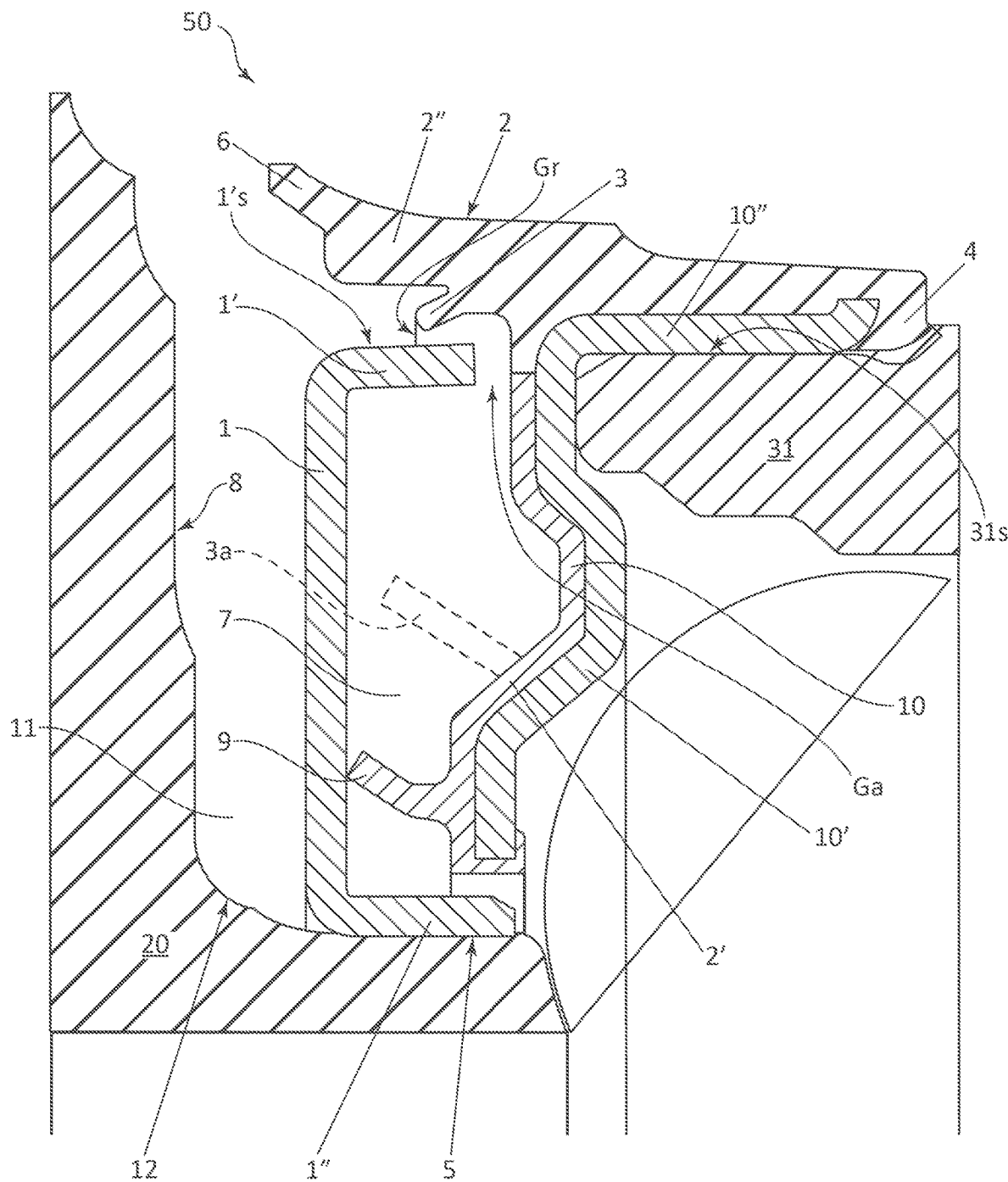
FIG. 2 is a detail of the wheel hub assembly according to FIG. 1 in which there is provided a sealing device for a bearing unit, according to an embodiment of the present invention, housed between the rings of the bearing unit.

As shown in FIG. 2, there may be more than one radial labyrinth seal. For example, a second non-contacting lip 3a could be formed, said lip extending from the annular shaped portion 2' of the elastomer coating 2 and facing the radially inner surface of the wing 1', forming a second radial labyrinth seal, more or less specular (with respect to the wing 1'), of the first radial labyrinth seal. Obviously, the presence of a second radial labyrinth seal 3a reinforces the capacity for a barrier effect in respect of external contaminants of the sealing device 50.

Moreover, owing to the C-shaped form of a metal screen 1, wing 1' of such screen faces in the axial direction the annular shaped portion 2' of an elastomer coating 2. In this way, a second axial labyrinth seal Ga is created, said seal cooperating with the radial labyrinth seal Gr (or with the radial labyrinth seals, should there be more than one), in order to help improve the barrier effect in relation to the external contaminants. Advantageously, the size of the opening of a second axial labyrinth seal Ga may be between 0.2 mm and 1.00 mm.

Even though not shown in FIG. 2, the sealing device 50 could have a non axial-symmetrical geometry: in other words, its components, both the stationary part, and the rotatable part, could have a circumferential extension with an amplitude of between 180° and 260°. In this way, by assembling with precision the bearing unit and the wheel hub assembly so that the sealing device has the solid portion of its components directed towards the top of the motor vehicle and so that it is open towards the bottom of the same motor vehicle, the sealing device is able to operate as a barrier in respect of the contaminants entering from the top of the motor vehicle and allow the free flow thereof towards the bottom of the motor vehicle.

A bearing unit 30, provided with a sealing device 50 in accordance with this disclosure, has further characteristics relating to the cavities 35, 36 which house the sealing device 50.

A first characteristic is the maximization of the volume of the pre-chamber 7 contained between the metal screen 1, the annular shaped portion 2' of the elastomer coating 2 and the contacting lip 9. Owing to the greater volume of this pre-chamber, it is possible to contain and drain a greater quantity of contaminants without them reaching the sensitive components of the bearing unit, namely the rolling elements and raceways. The increase in the volume of the pre-chamber 7 is obtained by combining the following characteristics: positioning wing 1' of metal screen 1 as far as possible from a rotation axis X of a bearing unit in the radially external direction until a radially outer surface 1's of the wing 1' is aligned with a radially outer surface 31s of a radially outer ring 31, and by shaping 2' and 10' in an axially internal direction the elastomer coating 2 and the metal support screen 10, respectively, and by positioning a contacting lip 9 as close as possible to a cylindrical surface 5 of a flanged ring 20, namely a radially inner wing 1" of the metal screen 1.

An increase in volume of a pre-chamber 7 in accordance with this disclosure has been found to optimize the aforementioned characteristics by 60% to 70% with respect to known alternative solutions.

Finally, a second pre-chamber 11 is formed inside a cavity 35 between an annular surface 8 of a flanged ring 20, a cylindrical surface 5 of the same flanged ring 20, a metal screen 1 and a cylindrical portion 2" (including a lug 6) of an elastomer coating 2. In this case too, a second pre-chamber 11 has the function of containing/draining external contaminants and must be designed with dimensions such that its volume is as large as possible. This is achieved by introducing and maximizing a connecting radius 12 between an annular surface 8 of a flanged ring 20 and a cylindrical surface 5 of the same flanged ring 20. With an increase in a connecting radius R an axial distance between a metal screen 1 and an annular surface 8 of a flanged ring 20 will increase, and consequently a volume of a pre-chamber 11 will increase. Owing to such a configuration of the pre-chamber 11, incoming contaminants will be subject to a vertical motion which will create a series of impacts against the walls of the pre-chamber and a consequent "rebound" effect which will allow expulsion of at least part thereof.

Solutions designed in accordance with this disclosure offers the undoubted advantage of improving sealing capacity despite a limited number of contact points, i.e., contacting lips, while ensuring a low level of energy dissipation due to friction of a sealing device.

In order to solve substantially the aforementioned technical problems, an object of the present disclosure is to define a cassette sealing device provided with internal labyrinth seals which help protect the bearing unit from external contaminants. A "labyrinth seal" is understood as meaning a complex path created by suitably shaping components of the said sealing device.

This solution is able to reduce to a minimum the number of contacting lips and consequently the dissipation of energy due to friction.

According to the present disclosure, labyrinth seals are formed by suitably shaping both a rotating metal screen and an elastomer coating. In this way suitable openings which face corresponding portions of an elastomer coating of a sealing device and shaped metal parts are formed.

According to another aspect, a sealing device and housing thereof inside a bearing unit are realized so as to increase the internal volumes, so that the latter may form larger reservoirs for storing the contaminants which manage to pass beyond the aforementioned labyrinth seals.

Further preferred and/or particularly advantageous embodiments of the invention are described in accordance with the characteristic features indicated in the attached dependent claims.

In addition to the embodiment as described above, it must be understood that there are numerous other variants. It must also be understood that these embodiments are only examples and do not limit either the scope of the invention, nor its applications, nor its possible configurations. On the contrary, although the description above allows the person skilled in the art to implement the present invention at least according to one of its examples of embodiment, it must be understood that many variants of the components described are possible, without thereby departing from the scope of the invention, as defined in the accompanying claims, interpreted literally and/or in accordance with their legal equivalents.

The invention claimed is:

1. A sealing device for a bearing unit comprising a radially outer ring and at least one radially inner ring, the sealing device, comprising:
    a stationary part, comprising:
        a first metal screen comprising:
            an annular shaped portion; and
            a cylindrical portion, wherein the cylindrical portion is radially external with respect to the annular shaped portion and configured to extend in an axially inward direction toward a center of the bearing unit;
    an elastomer coating comprising:
        at least one annular shaped elastomeric portion;
        a cylindrical elastomeric portion;
        a contacting lip further defined by the elastomeric coating radially internally with respect to the cylindrical elastomeric portion and axially external with respect to the annular shaped portion;
        a first non-contacting lip extending radially and internally from the cylindrical elastomeric portion,
    wherein the elastomer coating is co-moulded on the first screen in a radially external and axially external position with respect to the first screen; and
    a rotatable part, comprising:
        a second metal screen comprising a radially extending portion and
        a radially outer wing,
    wherein the radially outer wing and the first non-contacting lip define a first radial labyrinth seal,
    the contacting lip is configured to make sliding contact with the second metal screen,
    wherein a radially outer surface of the radially outer wing is configured to align radially with an outer radial surface of the radially outer ring.

2. The sealing device of claim 1, further wherein the cylindrical elastomeric portion comprises an appendage in an axially external and radially external oblique direction with respect to the cylindrical elastomeric portion.

3. The sealing device of claim 2, wherein the appendage extends axially externally beyond the second metal screen relative to the first metal screen.

4. The sealing device of claim 1, wherein the size of a meatus of the first radial labyrinth seal is between 0.1 mm and 0.8 mm.

5. The sealing device of claim 1, wherein a second axial labyrinth seal is defined by the radially outer wing of the second metal screen and the annular shaped elastomeric portion.

6. The sealing device of claim 5, wherein a size of a meatus of the second axial labyrinth seal is between 0.2 mm and 1.0 mm.

7. The sealing device of claim 1, wherein a second radial labyrinth seal is defined by a second non-contacting lip extending from the annular shaped elastomeric portion towards a radially internal surface of the radially outer wing of the second screen.

8. The sealing device of claim 1, wherein both the stationary part and the rotating part have a circumferential extension with an amplitude comprised between 180° and 260°.

9. A bearing unit having an axis of rotation (X), comprising:
    a flanged first radially inner, rotatable, ring;
    a radially external, stationary, ring;
    a second radially inner ring, rotatable, mounted on and integral with the flanged first radially inner ring;
    a plurality of rolling bodies interposed between the radially outer ring and both the first and second radially inner rings; and
    a sealing device comprising:
        a stationary part comprising:
            a first metal screen comprising:
                an annular shaped portion; and a cylindrical portion, wherein the cylindrical portion is radially external with respect to the annular shaped portion;

an elastomer coating comprising:
an annular shaped elastomeric portion;
a cylindrical elastomeric portion;
a contacting lip radially internal with respect to the cylindrical elastomeric portion and axially external with respect to the annular shape elastomeric portion; and
a first non-contacting lip extending radially and internally from the cylindrical elastomeric portion,
wherein the elastomer coating is co-moulded on the first metal screen in a radially external position with respect to the first metal screen, a rotatable part comprising:
a second metal screen comprising:
a first portion extending radially; and
a radially outer wing,
wherein the contacting lip is configured to make sliding contact with the second metal screen,
the radially outer wing and the first non-contacting lip define a first radial labyrinth seal,
a first pre-chamber is defined between the first metal screen, the annular shaped elastomeric portion, and the contacting lip, and
a radially outer surface of the radially outer wing of the second metal screen is radially flush with an outer radial surface of the radially outer ring.

10. The bearing unit of claim 9, wherein the annular portion and the annular elastomer portion are shaped concavely in an axially internal direction.

11. The bearing unit of claim 10, wherein the contacting lip faces a radially inner wing of the second metal screen.

12. The bearing unit of claim 9, wherein a second pre-chamber is defined as a cavity between an annular surface of the flanged radially inner ring, a cylindrical surface of the flanged radially inner ring, the second metal screen and the cylindrical elastomer portion.

13. The bearing unit of claim 12, characterized in that the volume of the second pre-chamber is proportional to the length of a connecting radius between the annular surface of the flanged radially inner ring and the cylindrical surface of the flanged radially inner ring.

14. A bearing unit, comprising:
a flanged first radially inner, rotatable, ring;
a radially outer, stationary, ring;
a second radially inner ring, rotatable, mounted on, and integral with the flanged radially inner ring;
a plurality of rolling bodies interposed between the radially outer ring and both the first and second radially inner rings; and a sealing device disposed in a cavity defined by the flanged first inner ring and the outer ring, the sealing device comprising:
a first metal screen affixed to the radially outer ring, comprising:
an annular shaped portion; and
a cylindrical portion, the cylindrical portion being radially external with respect to the annular shaped portion;
an elastomer coating comprising:
an annular shaped elastomeric portion;
a cylindrical elastomeric portion;
a contacting lip radially internal with respect to the cylindrical elastomeric portion and axially external with respect to the annular shaped portion; and
a non-contacting lip extending radially and internally from the cylindrical elastomeric portion wherein the elastomer coating is co-moulded on the first screen and positioned radially external and axially external with respect to the first metal screen;
a c-Shaped second metal screen comprising a radially outer wing and affixed to the flanged first radially inner ring,
wherein the contacting lip is configured to make sliding contact with a surface of the c-shaped second metal screen,
the radially outer wing of the second metal screen and the non-contacting lip define between them a first radial labyrinth seal,
an annular surface of the flanged inner ring, a cylindrical surface of the flanged inner ring, a connecting radius connecting the annular surface of the flanged inner ring the cylindrical surface of the flanged inner ring, the c-shaped metal screen, and the cylindrical elastomer portion define between them a cavity configured to contain and expel contaminants by subjecting the contaminants to vertical motion during use, and
a volume of the cavity is proportional to a length of the connecting radius.

15. The bearing unit of claim 14, further wherein the cylindrical elastomeric portion comprises an appendage in an axially external and radially external oblique direction with respect to the cylindrical elastomeric portion.

16. The bearing unit of claim 14, wherein a size of a meatus of the first radial labyrinth seal is between 0.1 mm and 0.8 mm.

17. The bearing unit of claim 14, wherein a second axial labyrinth seal is defined by the radially outer wing of the second metal screen and the annular shaped elastomeric portion.

18. The bearing unit of claim 17, wherein a size of a meatus of the second axial labyrinth seal is between 0.2 mm and 1.0 mm.

* * * * *